(12) United States Patent
Hoff

(10) Patent No.: US 7,234,416 B2
(45) Date of Patent: Jun. 26, 2007

(54) PEST-PROOF BIRD FEEDER

(76) Inventor: Thomas Hoff, 54 Camp Rd., Red Hook, NY (US) 12571

(*) Notice: Subject to any disclaimer, the term of this patent is extended or adjusted under 35 U.S.C. 154(b) by 0 days.

(21) Appl. No.: 11/194,832

(22) Filed: Aug. 1, 2005

(65) Prior Publication Data
US 2006/0288944 A1    Dec. 28, 2006

Related U.S. Application Data

(60) Provisional application No. 60/693,677, filed on Jun. 24, 2005.

(51) Int. Cl.
*A01K 61/02* (2006.01)

(52) U.S. Cl. ............... 119/57.9; 119/52.2; 119/57.8

(58) Field of Classification Search ....... D30/124–128; 119/57.9, 57.8, 52.3, 52.1, 52.2, 52.4, 51.01
See application file for complete search history.

(56) References Cited

U.S. PATENT DOCUMENTS

| | | | | |
|---|---|---|---|---|
| 2,344,367 A | * | 3/1944 | Puschel | 119/52.3 |
| 2,591,459 A | * | 4/1952 | Meany | 119/52.1 |
| 2,884,899 A | * | 5/1959 | Jackes et al. | 119/53 |
| 2,961,995 A | * | 11/1960 | Martin | 119/53 |
| 4,732,112 A | * | 3/1988 | Fenner et al. | 119/52.2 |
| D320,097 S | * | 9/1991 | Vajtay | D30/127 |
| D331,647 S | * | 12/1992 | Embree | D30/124 |
| 5,479,879 A | * | 1/1996 | Biek | 119/52.2 |
| 5,964,183 A | | 10/1999 | Czipri | |
| D428,537 S | * | 7/2000 | Miller | D30/124 |
| 6,415,737 B2 | | 7/2002 | Banyas et al. | |
| 6,543,384 B2 | * | 4/2003 | Cote | 119/57.9 |
| 6,591,781 B2 | * | 7/2003 | Hardison | 119/57.9 |
| 6,622,654 B2 | | 9/2003 | Fasio | |
| D488,590 S | * | 4/2004 | Fort, II | D30/124 |
| 6,918,353 B1 | * | 7/2005 | Coroneos | 119/57.1 |

FOREIGN PATENT DOCUMENTS

CA    2330868    *    1/2001

* cited by examiner

*Primary Examiner*—Andrea Valenti

(57) ABSTRACT

A pest-proof bird feeder for supplying bird feed to song birds includes a storage container for bird food. A cap is mounted on the upper end of the storage container. A lower collar is mounted on the lower end of the storage container. An inner cylinder extends from the base. The inner cylinder has a plurality of food ports. A baffle located toward the lower end of the storage container for directing the supply of bird food to the food ports. A barrier is located in the inner cylinder. An outer sleeve is mounted to slide on the inner cylinder. A lower cable extends substantially from the center point of the barrier. The lower cable is connected to the center point of the perch. An upper cable extends from the storage container and the cap to suspend the bird feeder.

5 Claims, 4 Drawing Sheets

PEST-PROOF BIRD FEEDER

CROSS REFERENCE TO RELATED APPLICATION

This patent application claims the benefit of an earlier filing date under 35 USC 119(e) of a Provisional Patent Application, filed in the United States Patent and Trademark Office on Jun. 24, 2005 and entitled Bird Feeders with Tilting Platform and Feed Shutoff and being Provisional Patent Application 60/693,677.

BACKGROUND OF THE INVENTION

1. Field of the Invention

This invention relates to bird feeders and, more specifically, to a bird feeder which closes the food ports when the perch is tilted by the presence of a pest on the perch thereby simultaneously ejecting the pest from the perch and closing the food ports.

2. Prior Art

A well-recognized problem with bird feeders is their attraction to a wide variety of pests who will go to extreme lengths to eat the bird food intended for small song birds. Squirrels are one of the most persistent of these pests and have an annoying ability to find a way around the barriers placed in their way. The term "pest" or "pests" as used herein refers to a wide variety of creatures including but not limited to squirrels, racoons, rats and large birds, such as hawks.

Various patents have been issued on bird feeders which are intended to prevent the consumption of the bird food by pests. One approach used is to provide a platform or perch which will tilt so as to force the pest to fall to the ground. Another approach is to cause the food supply to be cut off by closing the food ports from which a pest can obtain the bird food. However, the prior art does not teach a bird feeder which both forces the pest from the perch and also closes off all access to the bird food.

Many of the proposed bird feeders are complex and it is commonplace but not universal in the designs to utilize springs. As is well known, springs weaken resulting in a lessening of the period of use before maintenance is needed.

One attempt to protect a bird feeder is found in the Latham Patent, U.S. Pat. No. 4,523,546. This patent teaches a flexible sheet, either at the top or above a bird feeder. The flexible sheet will fold down when a pest attempts to become positioned on it and the pest accordingly will slide off the sheet. This device offers some protection but cannot serve any benefit as to pests that fly.

The Czipi Patent, U.S. Pat. No. 5,964,183, has a vertical cylindrical storage facility with aces ports to the bird food at the lower end. An outer shroud is forced downwardly by the weight of a pest to close the food ports. The weight of a pest overcomes either a spring-loaded lever or a weight. Access to the bird food is denied but the pest is not forced off the perch.

The Banyas et al Patent, U.S. Pat. No. 6,415,737, teaches spring-loaded perches which fold down and which force the pest off the bird feeder but which do not close off the food ports.

The Cote Patent, U.S. Pat. No. 8,543,384, teaches a hanging bird feeder with an elongated storage container, which is located vertically and is covered at the top from which the bird feeder may be suspended. At the base, a perch is isolated with food ports adjacent the food ports. Although the perch is moved slightly lower, the pest is not expelled from the bird feeder.

The Hardison Patent, U.S. Pat. No. 6,591,781 also teaches a feeder, which like the Cote Patent, provides for a perch which moves when occupied by a pest. The perch does move and may even tilt but not sufficiently to force the pest off the perch. The Hardison Patent essentially teaches a bird feeder which closes the food ports to the bird feeder due to the weight of the pest. An ejection of the pest does not occur.

The Faschio Patent, U.S. Pat. No. 6,622,654, teaches a perch which folds down significantly when a pest occupies the perch. Most pests are accordingly forced off the perch but access to the bird food remains open for any pest who can retain a position by the bird food.

A bird feeder, which was not the subject of any known patent, also provides for forcing the pest off the perch but leases open access to the bird food. That design has a cylindrical member extending from the storage container which is closed off by a barrier. A disc-shaped perch is located at the lower end of the cylindrical member and is held in place by a spring expending from the center point of the perch to the center point of the barrier. The perch has a diameter significantly larger than the dimmer of the cylindrical member. The strength of the spring is inadequate to support a pest on the perch and will tip down dislodging the pest but will remain in place on the bottom of the cylindrical member when the perch is occupied by the desired song birds. Notwithstanding the assumed ejection of the pest, the food ports located in the cylindrical member above the barrier remain open. Should a pest be able to hang onto the perch or to fly, the bird food could still be consumed by the unwanted pest.

OBJECTS

The objects of this invention are to provide a bird feeder as follows:

1. Having a simple design.
2. Having no springs.
3. That is economical to produce.
4. That is durable.
5. That closes the food port of ports simultaneously when forcing a pest off the perch.

Other objects, advantages and capabilities of the invention will become apparent from the foregoing description together in conjunction with the accompanying drawings showing the preferred embodiments of the invention.

SUMMARY OF THE INVENTION

A pest-proof bird feeder is provided for supplying bird feed to song birds. A storage container means has a lower end and an upper end. An inner cylinder extends from and is connected to the lower end of the storage container means and has at least one food port located adjacent the storage container means. An outer sleeve has an upper end and a lower end mounted to slide on the inner cylinder. A perch is provided. A means for blocking the flow of bird feed from the lower end of the inner cylinder is included along with a means for supporting the perch. The outer sleeve rests on the perch while permitting the perch to be tipped and to force the outer sleeve over the food port. A means is also included for hanging the pest-proof bird feeder.

BRIEF DESCRIPTION OF THE NUMERALS

| NUMERAL | DESCRIPTION |
|---|---|
| 11 | Top End |
| 13 | Bottom End |
| 15 | Cap |
| 17 | Lid |
| 19 | Upper collar |
| 21 | Storage Container |
| 23 | Upper End |
| 25 | Lower End |
| 27 | Lower Collar |
| 29 | Base |
| 31 | Inner Cylinder |
| 33 | Upper End |
| 35 | Lower End |
| 37 | Outer Surface |
| 39 | Food Ports |
| 41 | Baffle |
| 43 | Barrier |
| 45 | Center Point |
| 47 | Cable Stop |
| 49 | Upper Cable |
| 53 | Outer Sleeve |
| 55 | Upper End |
| 57 | Lower End |
| 59 | Perch |
| 61 | Lower Cable |
| 63 | Center Point |
| 67 | Bottom Surface |
| 69 | Upper Surface |
| 71 | Center Area |
| 73 | Annular Groove |
| 75 | Raised Annular Rim |
| 77 | Outer Edge |

DETAILED DESCRIPTION OF THE PREFERRED EMBODIMENT

Figure 1:
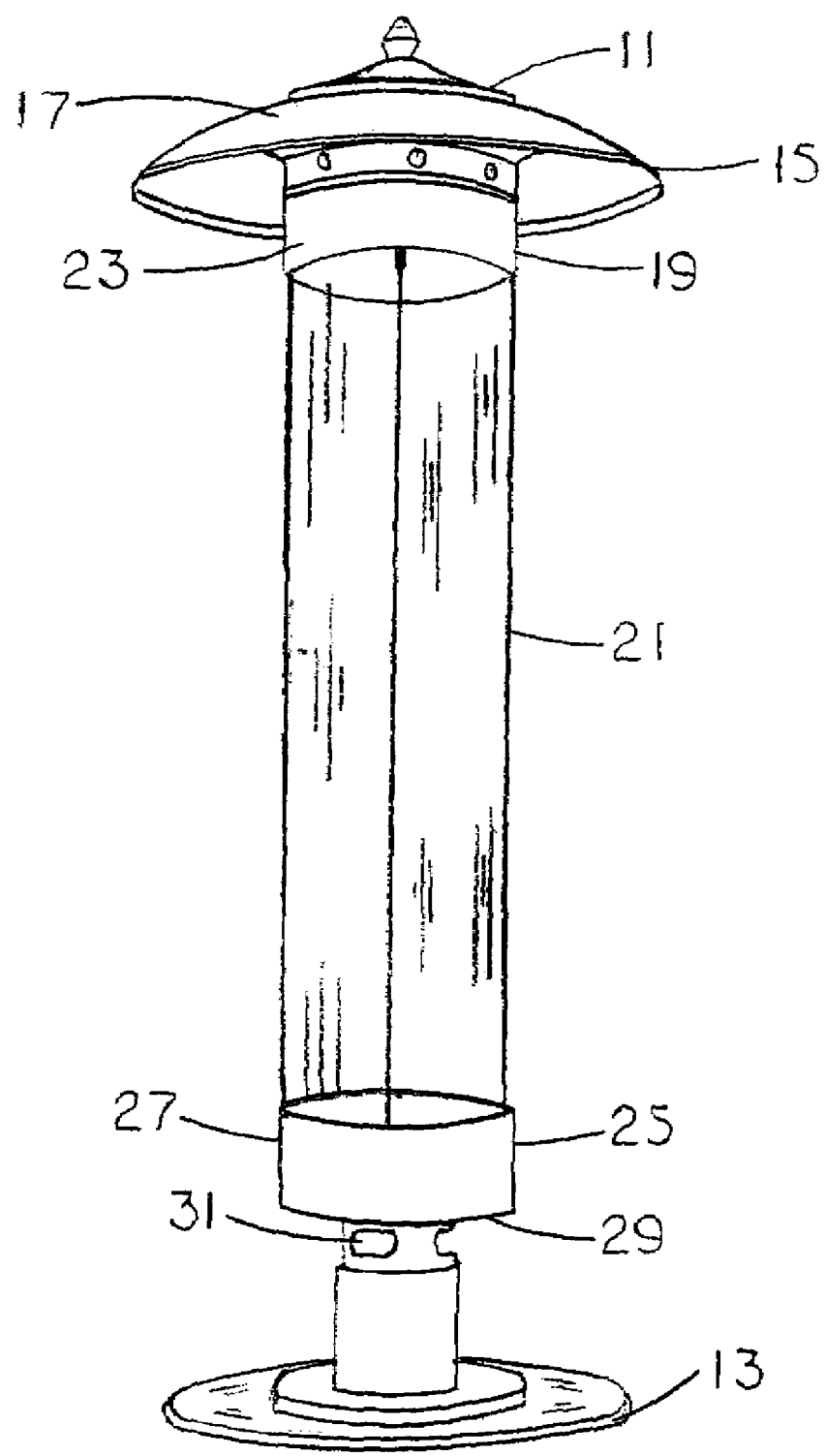
FIG. 1 is a pictorial view of the bird feeder as hung in a vertical position.

Referring to FIG. 1, the bird feeder is shown, as it would be positioned for use, namely in a vertical position. The bird feeder has a top end 11 and a bottom end 13 and is suspended in a vertical position from the top end 11. At the top end 11, a cap 15 is situated on the bird feeder. The cap 15, which is preferably removable, includes not only a lid 17 but also an upper collar 19. Beneath the cap 15, there is a storage container 21 used to store the bird food which is dispersed by the bird feeder. The storage container 21 has an upper end 23 at the top end 11 of the bird feeder and, at the opposite end the storage container 21, has a lower end 25. The storage container 21 is preferably transparent to permit visual observation as to the level of the remaining bird food in the storage container 21. The storage container 21 is most usually an elongated cylinder. The upper collar 19 of the cap 15 is sized to slide over the upper end 23 of the storage container 21. A general combination of a cap 15, even if not removable, and a storage container 21 is a food storage means.

Figure 4:
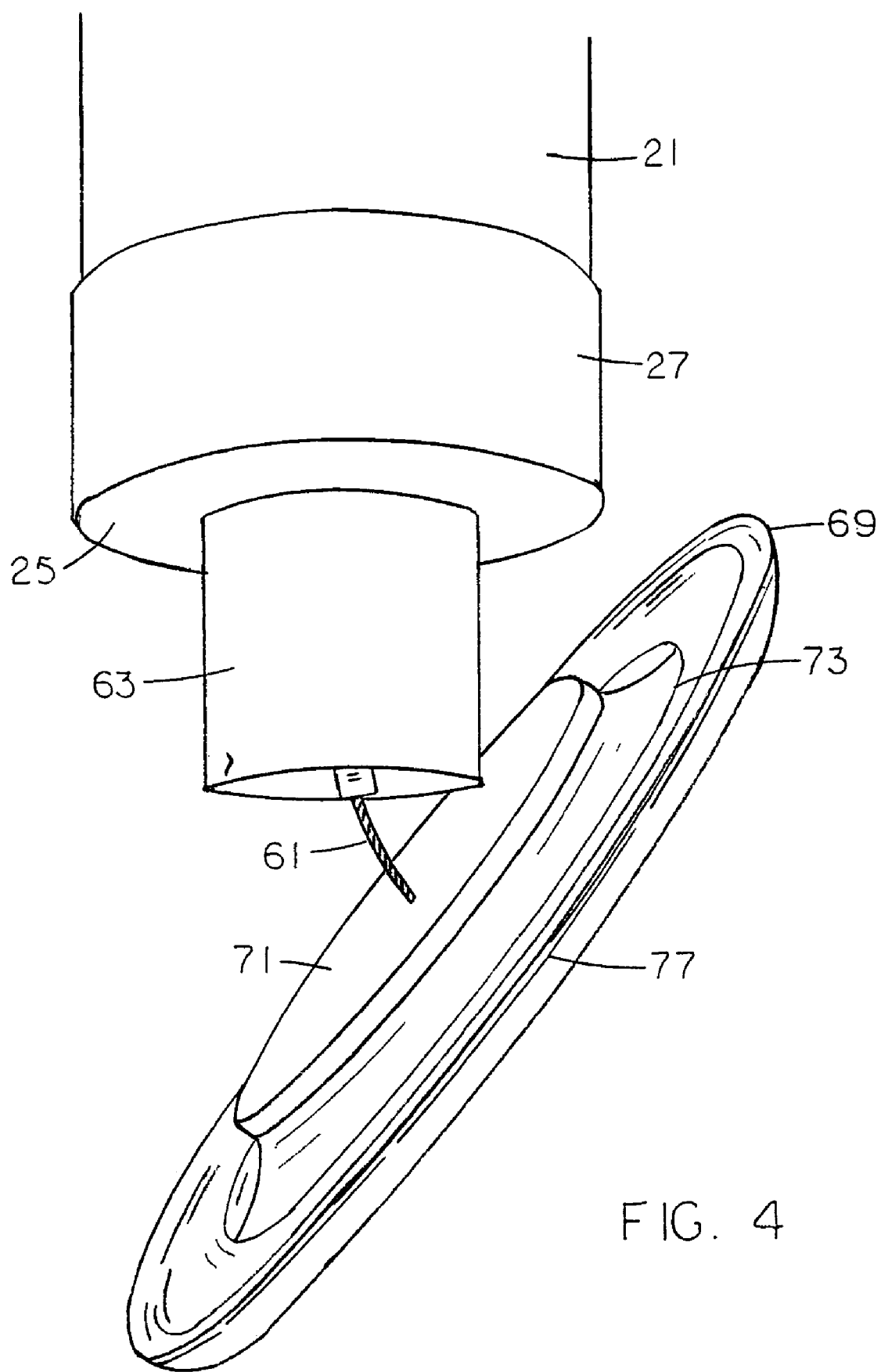
FIG. 4 is pictorial view of the bottom end of the bird feeder with the perch tilted and the food ports closed.

As seen in FIG. 4, a lower collar 27 is affixed to the storage container 21 at the lower end 25 which also includes a base 29 which partially obstructs the lower end 25 of the storage container 21. An inner cylinder 31 extends from the base 29 concentrically with both the storage container 21 and the base 29. The inner cylinder 31 has an upper end 33 which is affixed to the base 29 and a lower end 35. The inner cylinder 31 is open at both ends 33,35 and the base 29 extends to the inner cylinder 31 but the inner cylinder 31 is not obstructed by the base 29. Accordingly, bird food from the storage container 21 can flow into the inner cylinder 31. The inner cylinder 31 has an outer surface 37. Adjacent the base 29, toward the upper end 33 of the inner cylinder 31, the inner cylinder 31 has at least one and usually a plurality of food ports 39 through which the food stored in the storage container 21 is fed to the food port or food ports 39, as the case may be, for consumption by song birds. The food ports 39 are preferably in a common plane and are spaced essentially the same distance from the base 29 and from the lower end 35 of the inner cylinder 31. A plurality of food ports 39 preferably are evenly spaced about the inner cylinder 31.

A baffle 41 (FIG. 2) is located at the bottom end 25 of the storage container 21 and directs the bird food from the storage container 21 to the food ports 39. Beneath the food ports 39 and across the interior of the inner cylinder 31, there is a barrier 43. The barrier 43 which is preferably a plate, blocks the inner cylinder 31 and prevents the flow of bird food from the storage container 21 out the lower end 35 of the inner cylinder 31 and is a means for blocking the flow of bird food from lower end 35 of the inner cylinder 31. However, since the food ports 39 are above the barrier 43, the flow of bird food through the food ports 39 is not prevented by the barrier 43. The barrier 43 has a center point 45. A cable stop 47 is located generally at the center point 45 of the barrier 43.

An upper cable 49 extends from the cable stop 47 upwardly through the storage container 21 and the cap 15. The upper cable 49 provides a positive connector for hanging the bird feeder. The upper cable 49 is a means for hanging the pest-proof bird feeder. Alternative means can be provided for suspending the bird feeder.

An outer sleeve 53 is mounted on the inner cylinder 31 to slide on the outer surface 37 of the inner cylinder 31. The outer sleeve 53 also has an upper end 55 and a lower end 57. The outer sleeve 53 is snugly fitted onto the inner cylinder 31 with a sufficient clearance to permit he outer sleeve 53 readily to slide on the inner cylinder 31. The outer sleeve 53 is longer than the inner cylinder 31 and is normally located with its upper end 55 below the food ports 39.

Figure 2:
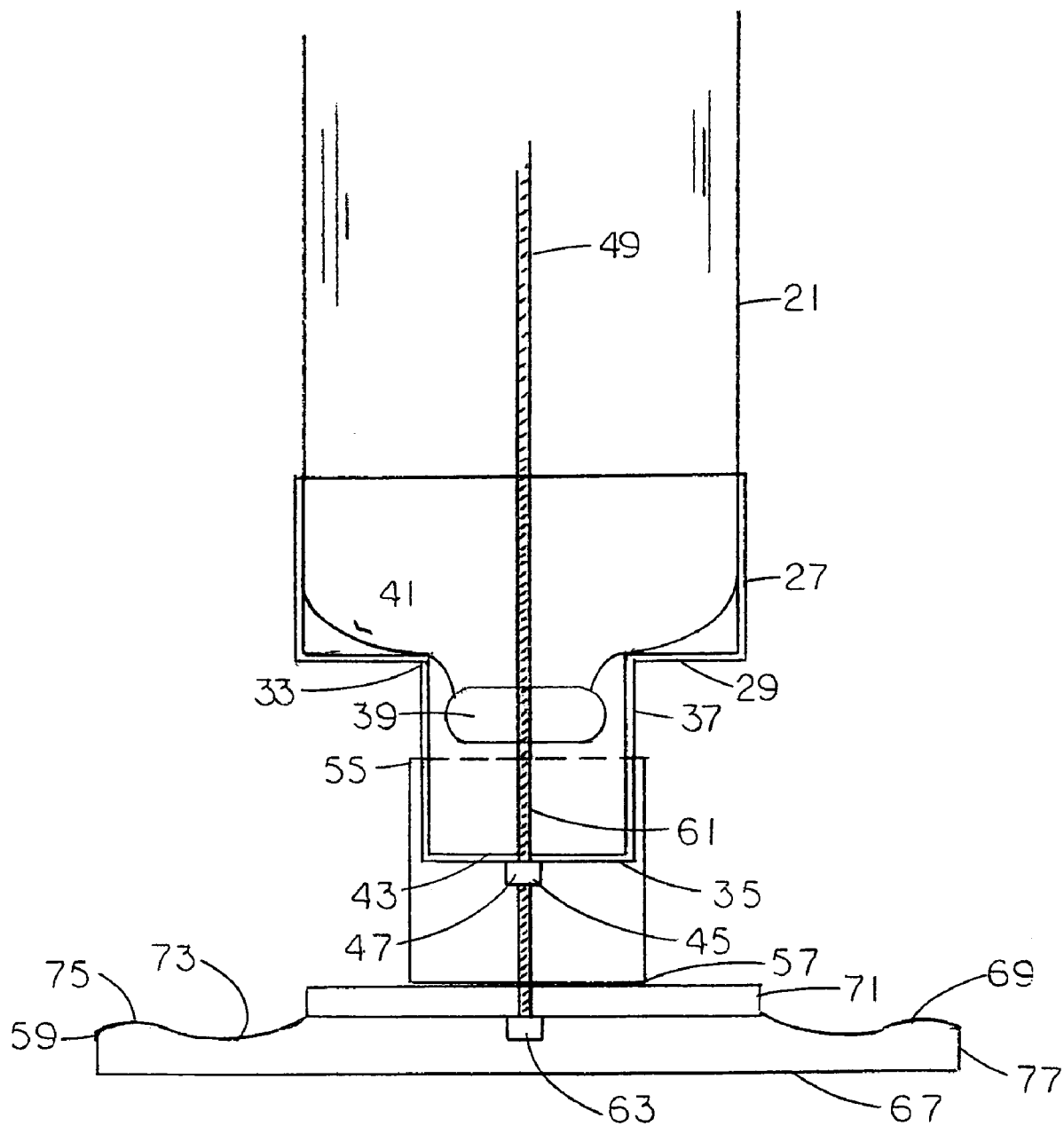
FIG. 2 is a cross-sectional view of the bottom end of the bird feeder showing the inner cylinder and the outer sleeve.
Figure 3:
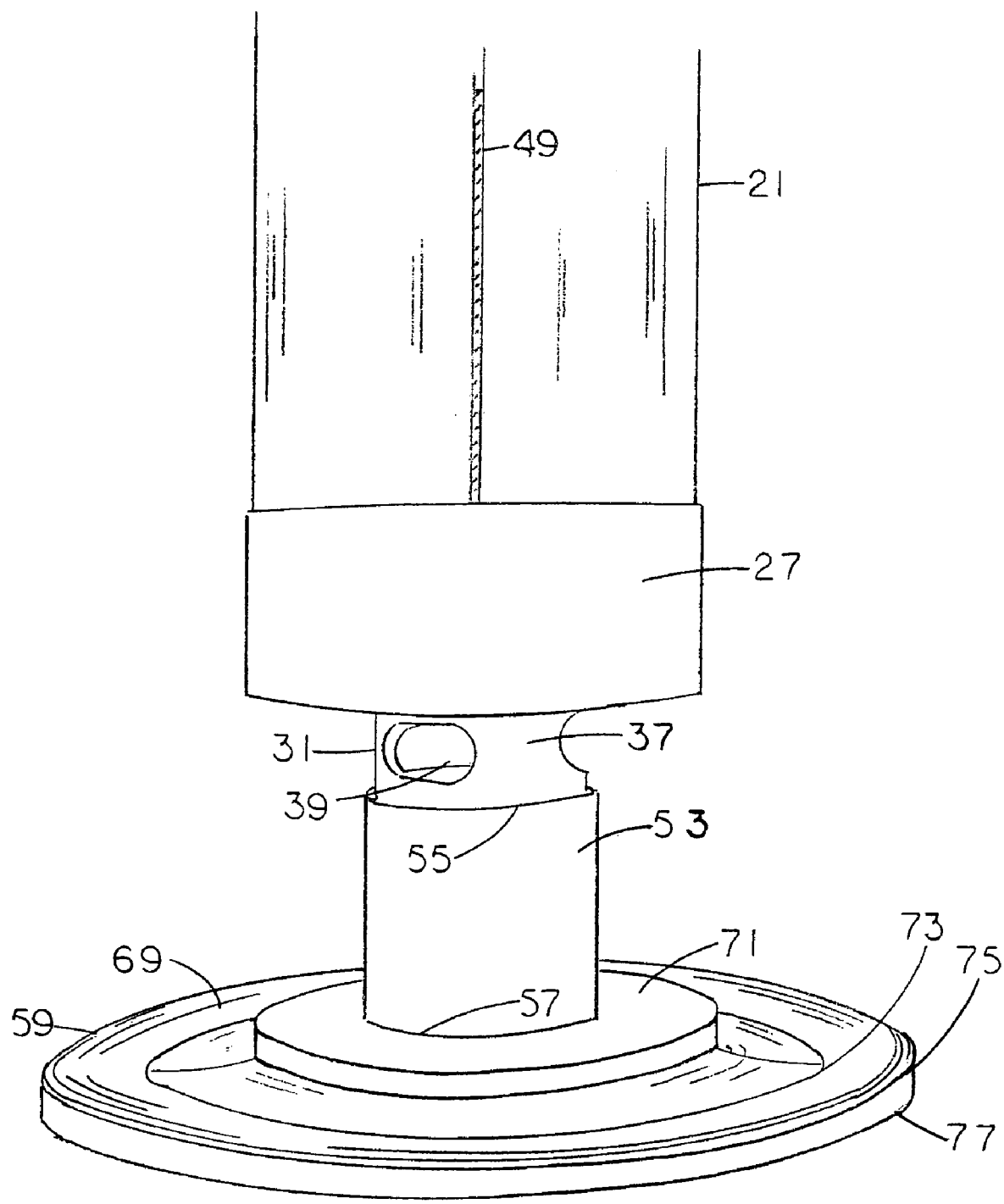
FIG. 3 is a pictorial view of the bottom end of the bird feeder with the perch in a horizontal position and with the food ports in the inner cylinder exposed.

As can be seen in FIG. 1 and in FIG. 2, a perch 59 is located at the lower end 57 of the outer sleeve 53. A lower cable 61 extends from and is secured to the cable stop 47 and to the center point 63 of the perch 59. The lower cable 61 is a means for supporting the perch 59. As seen in FIGS. 1, 2 and 3, with the bird feeder in a vertical position, the outer sleeve 53 is also vertical and extends well below the upper end 33 of the inner cylinder 31 while also extending upwardly over the inner cylinder 31 to a point slightly below the food ports 39. The perch 59, under such circumstances, is generally located in a horizontal position.

The weight of the outer sleeve 53 maintains the perch 59 in this generally horizontal position which remains undisturbed even with the weight of several song birds but absent the weight of a pest. With the weight of a pest on the perch

59, the perch 59 will tip on the lower cable 61 and force the outer sleeve 53 upwardly to close the food ports 39. When the perch 59 tips, (FIG. 4) due to the weight of a pest on the perch 59, the perch 59 engages a point on the lower end 57 of the outer sleeve 53 serving as a fulcrum. Simultaneously, the lower cable 61 bends to permit the perch 59 to tip. Since the cable 61 does not stretch but only bends, the perch 59 presses on the outer sleeve 53 forcing the outer sleeve to slide upwardly toward the storage container 21. When the perch 59 is tipped, the pest is usually forced off the perch 59 and the outer sleeve 53 is pushed upwardly a sufficient distance to close the food ports 39. In this way, both access to the bird food and a stable place to stand are denied to the pest. Once the pest is forced off the perch 59, the perch 59 returns to the generally horizontal position allowing the outer sleeve 53 to slide downwardly and open the food ports 39. Should a pest have an extraordinary ability to remain on the perch 59 when tilted, as might be possible for a bat due to its having suction cups on its feet, the bird food, which is the cause of the presence of the pest, is cut off.

The perch 59 has already been described as a circular disc. The perch 59 extends well beyond the outer sleeve 53 and the storage container 21. Preferably, the lid 17 and the perch 59, each being circular, extend generally the same distance. In this way, the lid 17 also covers the perch 59. The cap 15, the perch 59, the storage container 21 and the outer sleeve 53 and the inner cylinder 31 are each circular and each has a diameter. The diameter of the perch 59 and the cap 15 are greater than the diameter of the storage container 21 which is greater than the diameter of the outer sleeve 53 and inner cylinder 31. The diameter of the cap 15 and the perch 59 are substantially the same The perch 59 has a bottom surface 67 which is flat. The perch 59 also has an upper surface 69. A center area 71 on the upper surface 69 is concentrically located and is also flat. The center area 71 exceeds the size of the outer sleeve 53. The center area 71 is raised over the remainder of the upper surface 69. An annular groove 73 surrounds the center area 71 with a raised annular rim 75 at the outer edge 77 of the upper surface 69 of the perch 59

While a preferred embodiment is shown and described herein, it should be understood that the present disclosure is made by way of example only and that variations in the described Pest Proof Bird Feeder and its uses are possible within the scope of this disclosure without departing from the subject matter coming within the scope of the following claims, and a reasonable equivalency thereof, which claims I regard as my invention.

The invention claimed is:

1. A pest-proof bird feeder for supplying bird feed to song birds comprising:
   a storage container means having a lower end and an upper end;
   an inner cylinder having a lower end extending from and connected to the lower end of the storage container means and having at least one feed port located adjacent the storage container means;
   an outer sleeve having a upper end and a lower end mounted to slide on the inner cylinder;
   a perch:
   means for blocking the flow of bird food from the lower end of the inner cylinder, including a plate in the inner cylinder closing off the lower end of the inner cylinder opposite from the storage container means;
   means for supporting the perch including a lower cable extending from the means for blocking the flow of bird food, the outer sleeve resting on the perch while permitting the perch to be tipped and to force the outer sleeve over the food port; and
   means for hanging the pest-proof bird feeder, including an upper cable extending from the means for blocking the flow of bird food from the storage container means.

2. A pest-proof bird feeder according to claim 1 wherein the outer sleeve is longer than the inner cylinder.

3. A pest-proof bird feeder for supplying bird feed to song birds comprising:
   a storage container for bird food having a lower end and a upper end;
   a cap mounted on the upper end of the storage container;
   an inner cylinder extending from and mounted on the lower end of the storage container and having at least one food port located toward the storage container;
   a barrier in the inner cylinder beyond the food port from the storage container;
   a lower cable extending from the barrier:
   an outer sleeve mounted to slide on the inner cylinder;
   a perch, the lower cable being connected to the perch with the outer sleeve resting on the perch with the outer sleeve extending from the perch toward the food ports, the storage container, the inner cylinder, the outer sleeve being cylindrical and concentric and having a diameter and the perch being circular with a diameter and being concentric with the outer sleeve, the diameter of the storage container being larger than the diameter of the outer sleeve and the diameter of the perch being greater than the diameter of the storage container; and
   means for hanging the pest-proof bird feeder.

4. A pest-proof bird feeder for supplying bird feed to song birds comprising:
   a storage container for bird food being both cylindrical and transparent and having a lower end and an upper end;
   a cap removably mounted on the upper end of the storage container, the cap including a collar about the storage container and a lid over the upper end of the storage container extending beyond the storage container, the storage container being concentric with the lid;
   a lower collar mounted on the lower end of the storage container and including a base partially across the lower end of the storage container;
   an inner cylinder extending from the base generally concentrically with the lower collar and the storage container, the base having a center opening communicating with the inner cylinder, the inner cylinder having a plurality of food ports located adjacent and generally equidistant from the base and generally equally spaced about the inner cylinder;
   a baffle located toward the lower end of the storage container and extending into the inner cylinder for directing the supply of bird food to the food ports;
   a barrier located in the inner cylinder generally parallel to the base and beyond the feed ports from the base, the barrier having a center point;
   an outer sleeve mounted to slide on the inner cylinder, the outer sleeve being longer than the inner cylinder;
   a lower cable extending substantially from the center point of the barrier;
   a perch having the shape of a disc and having a center point, the lower cable being connected to the center point of the perch, the outer sleeve resting upon the perch and extending on the inner cylinder toward the food ports, the perch, the inner cylinder, the outer sleeve all being cylindrical and generally concentric; and an upper cable extending from the Center point of the barrier through the storage container and the cap.

5. A pest-proof bird feeder according to claim 4 wherein the outer sleeve the storage container and the perch all have a diameter and the perch has the largest diameter and the outer sleeve has the smallest diameter.

* * * * *